United States Patent Office 3,702,252
Patented Nov. 7, 1972

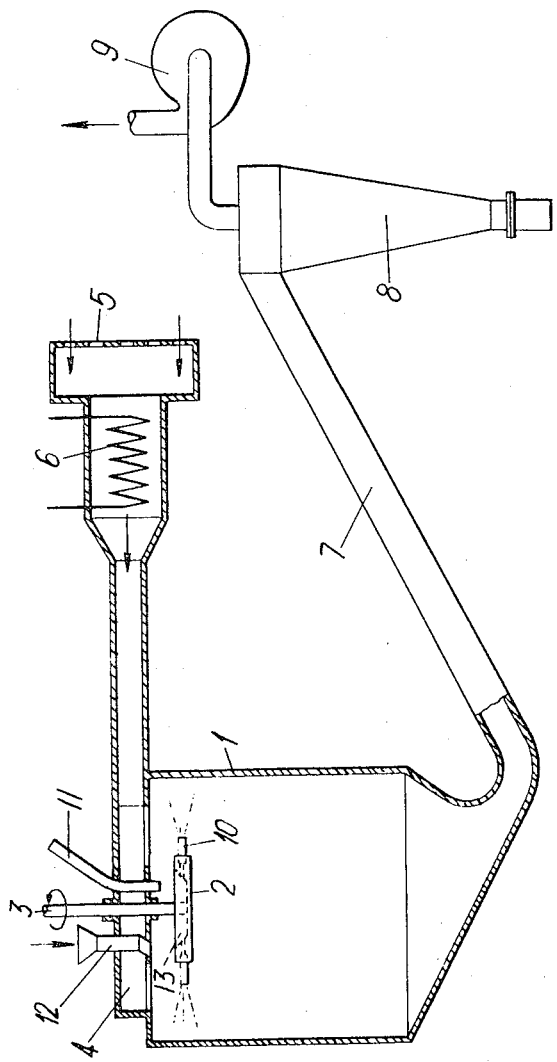
PRESTON L VELTMAN
HERMAN VAN BREDERODE
JOHANNES C J VERDONK
*Inventors*

---

3,702,252
SPRAY DRYING SOLID PARTICLES OF SUGAR AND RECYCLED CRUMB PRODUCT WITH LIQUID COMPONENT OF WATER, SUGAR COCOA MATERIAL, AND MILK SOLIDS TO PRODUCE CHOCOLATE CRUMB
Preston Leonard Veltman, Clarksville, Md., and Herman van Brederode and Johannes C. J. Verdonk, Koog-Zaandijk, Netherlands, assignors to N.V. Cocoafabriek de Zaan, Koog-Zaandijk, Netherlands
Filed July 7, 1970, Ser. No. 53,029
Int. Cl. A23g *1/00*
U.S. Cl. 99—23                               14 Claims

ABSTRACT OF THE DISCLOSURE

A process for preparing chocolate crumb, especially milk chocolate crumb, by forming the ingredients (for example sugar and cocoa butter, together with milk solids when making white or milk chocolate or with the cocoa butter in the form of cocoa liquor when making sweet or milk chocolate) into separate liquid and solid phases, and spray drying the liquid phase onto the solid phase, preferably in a centrifugal type spray drier. The spray dried product crumb is removed from the spraying zone by a current of heated air. Some of the crumb produced is preferably recycled as the solid phase. The solid phase may therefore include micro fine particles of sugar and recycled crumb product while the liquid phase may include water, cocoa butter, and milk solids.

---

This invention relates to improvements in chocolate manufacture and in particular to new processes for the production of "chocolate crumb." The invention also includes the improved chocolate crumb resulting from such processes and chocolates made from the new crumb.

Conventionally "milk chocolate crumb" is made by multiple stage vacuum evaporation of a uniform mixture of milk concentrate and sugar, followed by thorough mixing with cocoa mass and further vacuum evaporation of the product in the form of a sheet to produce a hard brittle crumb of low moisture content. This "crumb" is then crushed and progressively ground to the desired particle size. The process of forming a uniform product is long and hence expensive, and though use of vacuum treatment reduces the temperature of evaporation, caramelisation and other oxidative deterioration of the product occurs to a considerable extent and the flavour of fresh milk is largely or wholly destroyed.

It is an object of the present invention to minimise or eliminate the above disadvantages.

According to the present invention, the required ingredients for forming a solid chocolate crumb are formed into separate solid and liquid phases and the phases are sprayed into a current of heated gas so that the solids are showered through a mist of droplets of the liquid, and the resulting product is carried from the spraying zone by the gas current. Known forms of spray-drying apparatus are suitable for supplying the current of heated gas, e.g. air, and for atomising the liquid and most forms are readily adapted to provide for showering solid through the mist of liquid droplets, e.g. centrifugal spray-driers and vibrating screw dispensers.

The present invention may be applied to the manufacture of milk chocolate made from cocoa material, sugar and milk solids, for sweet chocolate made from cocoa material, sugar and water, and for white chocolate, made from cocoa butter, sugar and milk solids.

The terms "sweet chocolate," "white chocolate" and "milk chocolate" have in many countries statutory limitations on their contents, e.g. in the United States the total milk content must not be less than 3.66% by weight of the chocolate, the ratio of non-milk solids to milk fat must not exceed 2.43:1 and total milk solids must not be less than 12%. These products also may have different names in different countries, e.g. in Continental Europe "sweet chocolate" is just called "chocolate" and the United Kingdom "sweet chocolate" is called "plain chocolate."

The sugar component is preferably solely sucrose, but other sugars may be included, e.g. invert sugar, glucose, lactose or fructose, especially in amounts up to 5 to 20% by weight of the total sugar content. The total sugar in the final crumb may vary from a very low figure such as 5% or less, up to proportions of about 40 to 60% as is customary at present with milk chocolate crumb. With less than about 5% of sugar in the final crumb, the problem of crystallisation of the sugar, and caramelisation and oxidative deterioration becomes insignificant.

The cocoa butter component may be used in the form of cocoa material, preferably cocoa liquor having the desired fat content and which may have been prepared by the natural or alkalised method, though other kinds of cocoa material, e.g. pure cocoa butter (for white chocolate) and low or high fat cocoa powders may be used. The fat content may be 10 to 100% of the weight of cocoa material. The crumb may contain 5 to 60% e.g. 5.20% of cocoa liquor, for example, except in the case of white chocolate in which the cocoa liquor is replaced by cocoa butter. Part or all of the cocoa butter may be replaced by other fats, used together with the appropriate amount of cocoa.

The crumb may contain 20 to 55% by weight of milk solids in the case of white and milk chocolate crumb. The type of milk solid varies from skimmed milk powder to whole milk powder.

The solid component is preferably in the form of micro fine particles. Thus the sugar component may be the microcrystalline sucrose described in a co-pending Ser. No. 879,668, filed Nov. 25, 1969, in the names Veltman et al., now Pat. No. 3,600,222.

The liquid component in the case of making milk chocolate crumb for which the invention is particularly advantageous may be a milk concentrate, e.g. one containing up to 25% or more of fat, prepared for example by homogenisation of a mixture of condensed milk (15% fat) and cream in the desired proportions or by addition of water to milk powder of the desired fat content. The liquid component in any case may contain part of the sugar required in the final product as well as some cocoa liquor. The liquid component is not necessarily liquid at room temperature but must, according to the invention, be fed at a temperature at which it is sufficiently liquid to be readily pumped and atomised. We have worked satisfactorily with a liquid component containing 7.55 parts by weight of a milk concentrate (37% solids), 5.50 parts of crystallised sugar and 1.50 parts of natural cocoa liquor (56% fat content); since such a liquid is very viscous at about 30° C., it is preferably fed to the spray-drier at 70° C. Indeed feeding at such a temperature is of advantage in that it promotes evaporation. The presence of cocoa liquor in a liquid feed containing milk solids has an inhibiting effect on possible oxidation of such solids.

For preparing sweet chocolate crumb which is milk free, the liquid feed may comprise sugar, water and either cocoa, nib, and cocoa butter separately or as cocoa liquor in such proportions that the mixture can be sprayed at the spraying temperature, e.g. 70° C. The weight proportion of cocoa liquor to sugar is preferably between 3:5 and 5:4 especially 1:1, and the weight proportion of sugar to water is preferably not greater than 4:3.

It is important that the solid feed should be in sufficient quantity and in sufficiently fine form, and it is believed that is is important in order to provide enough surface to take up all or substantially all the droplets of the liquid feed as a thin layer on the solid surfaces. To this end a comparatively high ratio of solid feed to liquid feed is desirable, e.g. 0.5:4½ parts by weight of solid to 1 part by weight of solid in the liquid feed. We prefer to operate the process continuously under steady state conditions using as the solid feed a recycle product having the desired final composition, and a liquid feed having the desired final composition, with additional water. During the start-up period, the proportion of recycle to fresh solid in the solid feed is adjusted to give the required proportions in the final product.

If desired or necessary, the recycle solid may be given a light grinding before being fed back to the process. In addition the final product from the spray drying may be given a conching treatment.

The chocolate crumb prepared by the process of the invention may then be used in the well known manner to produce white, sweet or milk chocolates in the forms of for example moulded articles (e.g. bars, Easter eggs) and enrobed articles (e.g. chocolate coated confectionery) as well as chocolate sauces, etc. Known adjuvants, e.g. flavouring agents such as those of honey, nuts, and coffee may also be added to the liquid feed, or to the crumb produced before the manufacture of the finished chocolates.

The new process has the advantage over the known processes that the process per se takes less time, while the equipment required is much less complicated (e.g. because vacuum treatment is not necessary) and therefore less costly. Further, due to the quick drying, caramelisation is substantially eliminated and hence the product is suitable for a wide variety of chocolate taste types in contrast to the conventional crumb which always carries a caramel taste. Again, the use of microcrystalline sugar, as described above, saves grinding time and the presence throughout the drying process of cocoa, with its antioxidation properties, serves to preserve to a considerable extent the flavour of fresh milk when making milk chocolate crumb.

The product is a dry non-adherent product which is easy to process and does not adhere significantly to the process machinery. It also possesses the advantage that it is a uniform combination of components which is easier to handle by the user of the crumb than the separate raw materials. By the present process a crumb may be produced with the content of sugar, cocoa material, milk solids, fat and flavouring material each within a wide range.

We prefer to use a centrifugal type of spray-drier in the process of the present invention and such a machine is shown in the accompanying drawing illustrating diagrammatically a system for carrying out the new process. A nozzle type of spray-drier can also be used. Referring to the drawing, a spray-drying tower 1 is provided with a centrifugal spraying disc 2 carried by a spindle 3 through a cover plate and air distributor 4. Air is drawn in at 5 through a heater 6 and thence to distributor 4, tower 1 to a trunk 7 leading to one of a pair of cyclone separators 8 (only one shown) each surmounting a collector for the product. The cyclone separators 8 are connected alternately to the tower 1 and separate the product from the air which is drawn through the system by a blower 9. The outlet temperature of the gas which is removed from the apparatus by the blower 9 is preferably 60–75° C. The disc 2 is formed with a well 13 in its upper surface and leading from the well are two or more bore holes to the outer edge of the disc, the bore holes terminating in fine metal tubes or nozzles 10. Liquid feed is metered through inlet tube 11 to the well, while solids are fed via the aperture 12. While the air currents created by the rotating disc serve to scatter the solid particles through the mist of liquid droplets, it is preferable to provide a distributor to cause the powder to be dispersed as uniformly as possible in the air current.

In an alternative arrangement, the disc is formed with a well in its upper surface for receiving the solid feed and a cavity in the thickness of the disc, the cavity being fed through a hollow driving spindle with the liquid feed which is ejected, as before, through radial bore holes.

The liquid feed may be metered by any of the conventional metering pumps suitable for use with viscous liquids, e.g. a swash plate or gear wheel type of metering pump, as well as a peristaltic type pump for small scale production. The solid feed may be metered in the spray-drier by any suitable powder meter e.g. a vibrating screw dispenser.

In the preparation of the liquid feed for the production of milk chocolate crumb it is advantageous to dissolve the sugar in the milk concentrate, mix the product with the cocoa liquor and heat it to the entry temperature (e.g. 70° C.), all the steps being carried out continuously. It is inadvisable to maintain the feed at the entry temperature of 70° C. for more than a few minutes, because prolonged heating increases the viscosity of the feed due to swelling of the starch (in the cocoa) and milk solids. Homogenisation of the liquid feed may also have the same effect of increasing the viscosity. It is therefore preferable to pass the liquid directly to the spray-drier immediately after heating.

The process is illustrated in the following examples.

EXAMPLE 1

5.50 parts of crystallised sugar were added to 7.55 parts of condensed milk containing 37% solids and the product melted using hot water. 1.50 parts of natural cocoa liquor (56% fat content) were added with intensive mixing by a Thurax mixer until a uniform product was obtained. The product, calculated as containing 66.2% solids, was the liquid feed.

The solid feed was initially a mixture of equal parts of finely ground sugar and "cocoa preparation" (a commercial product of the approximate composition: 84% milk solids (15% fat) and 16% natural cocoa liquor (56% fat)). After the initial start up period the solid feed was recycled solid.

During operation of the process using the centrifugal spray-drier described above, the liquid feed at a temperature of about 70° C. was fed into the spray-drier at about 15.6 l./hr., while the solid feed at about 20 to 30° C. was added by means of a vibrating screw dispenser at 39 to 40 kg./hr. (i.e. at between 2 and 3 times the weight of liquid feed). The liquid was sprayed out of the outer ends of the tubes 10 of the disc, then ends having an orbital speed of 8,000 to 11,000 m./min. The liquid was sprayed into air, which had been heated in heater 6 to 110° C. and drawn through the spray-drier at about 2,100 kg./hr. The temperature of the exit air was about 60° C. About 5 kg./hr. of water was evaporated during the process. The product from the collector was cooled to 20 to 30° C. before being recycled as part of the solid feed. Further recycles were performed until the product had the desired composition. In each cycle the moisture content of the crumb produced was between 0.7 to 1.3%, and the crumb produced after six cycles had the desired composition of sugar: dry milk solids (26% milk fat): natural liquor of 55:27.5:15.

EXAMPLE 2

In the preparation of sweet chocolate crumb, the same conditions as used in the process described in Example 1 were used. The liquid feed comprised in parts by weight 200 sugar, 150 water and 200 cocoa liquor. The sugar had first been dissolved in the water and then the molten cocoa liquor added, while maintaining a temperature high enough to prevent solidification. The solid feed was finely ground sugar. A dry free flowing sweet chocolate crumb was produced.

It was found by experiment that a minimum amount of water was critical for the production of the liquid feed, as is shown in the table below.

TABLE

| Sugar | Water | Cocoa liquor | Comment |
|---|---|---|---|
| 200 | 80 | 200 | Sugar not completely soluble. |
| 200 | 100 | 200 | Liquid very viscous. |
| 200 | 150 | 200 | Liquid viscosity at 70° C. low enough for liquid to be sprayed. |

We claim:

1. A process for preparing a solid chocolate crumb which comprises:
    (a) forming the required ingredients into separate solid and liquid phases, wherein said solid phase comprises a member selected from the group consisting of finely divided sugar, recycled solid product, and mixtures thereof; and said liquid phase comprises uniform mixture of:
        (1) water,
        (2) sugar, and
        (3) a member selected from the group consisting of cocoa liquor, cocoa butter, and mixtures thereof;
    (b) automising the liquid phase into a mist of droplets by spraying;
    (c) showering the solid phase into the mist of droplets;
    (d) carrying the resultant solid product from the spraying zone by a current of heated gas;
    (e) evaporating water from the resultant solid product; and
    (f) recovering the resultant solid product from said gas current.

2. Process according to claim 1 wherein said resulting solid product is carried from said spraying zone by a current of heated air.

3. Process according to claim 1 wherein said solid phase is in the form of micro fine particles.

4. Process according to claim 1 wherein the liquid phase ingredients include sucrose, fats and cocoa.

5. Process according to claim 1 wherein said solid phase and the solids in the liquid phase between them contain at least 5% by weight of sugar.

6. Process according to claim 1 wherein when sweet chocolate crumb is being prepared said liquid phase feed comprises cocoa liquor and sugar in the weight ratio 3:5 to 5:4, and water in the weight ratio to the weight of sugar of at least 3:4.

7. Process according to claim 1 wherein the liquid phase ingredients include milk solids.

8. Process according to claim 7 wherein said liquid phase comprises sugar, milk solids and cocoa liquor.

9. Process according to claim 1 wherein the ratio of the weight of said solid phase feed to the weight of solid in said liquid phase feed is in the range 0.5 to 1 to 4.5:1.

10. Process according to claim 9 wherein said ratio is 2 to 3.

11. Process according to claim 1 which is operated continuosly and wherein part of the product is recycled as the sole solid phase feed.

12. Process according to claim 1 which is carried out in a spray drying apparatus of the centrifugal type.

13. Process according to claim 1 wherein the outlet temperature of the gas is 60 to 75° C.

14. The method of claim 1 wherein said liquid phase includes a member selected from the group consisting of milk, milk concentrates, milk solids and mixtures thereof.

References Cited
UNITED STATES PATENTS

| | | | |
|---|---|---|---|
| 3,027,257 | 3/1962 | Shenkerberg | 99—24 |
| 3,006,763 | 11/1961 | Marcy et al. | 99—26 |
| 2,850,388 | 9/1958 | Peebles et al. | 99—26 X |
| 3,622,342 | 11/1971 | Rusoff | 99—23 |

FOREIGN PATENTS

| | | | |
|---|---|---|---|
| 783,861 | 10/1957 | Great Britain | 99—24 |

S. LEON BASHORE, Primary Examiner

R. H. TUSHIN, Assistant Examiner

U.S. Cl. X.R.

99—24, 26, 203, 236